(12) United States Patent
Irie et al.

(10) Patent No.: US 8,310,273 B2
(45) Date of Patent: Nov. 13, 2012

(54) METHOD OF INSPECTING POWER CONVERTER AND INSPECTING DEVICE

(75) Inventors: Koji Irie, Tochigi (JP); Tetsu Yamada, Tochigi (JP); Hitoshi Saito, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 301 days.

(21) Appl. No.: 12/784,922

(22) Filed: May 21, 2010

(65) Prior Publication Data

US 2010/0295573 A1    Nov. 25, 2010

(30) Foreign Application Priority Data

May 22, 2009    (JP) ............................... P2009-123798

(51) Int. Cl.
*G01R 31/34* (2006.01)
*G01R 31/40* (2006.01)
(52) U.S. Cl. .............................. 324/765.01; 324/764.01
(58) Field of Classification Search .. 324/762.01–762.1, 324/765.01, 764.01; 318/490, 437, 569, 318/677; 363/36, 49, 55
See application file for complete search history.

(56) References Cited

U.S. PATENT DOCUMENTS

| | | | | |
|---|---|---|---|---|
| 4,843,533 A | * | 6/1989 | Roof et al. ....................... | 363/55 |
| 7,355,436 B2 | * | 4/2008 | Zehentner et al. ....... | 324/765.01 |

FOREIGN PATENT DOCUMENTS

| | | |
|---|---|---|
| DE | 100 62 855 A1 | 6/2002 |
| JP | 2005-160282 A | 6/2005 |

* cited by examiner

*Primary Examiner* — Tung X Nguyen
(74) *Attorney, Agent, or Firm* — Arent Fox LLP

(57) ABSTRACT

An inspecting ECU 4 and a GD substrate 3 are connected to an inverter circuit 100 for converting a power to be supplied from a voltage source 2 and outputting the converted power to a motor 5, and switch a conducting state of each of the elements in the inverter circuit 100. A conducting state of the element is switched in accordance with a driving condition for inspection corresponding to a whole active region of the element in a state that an inspecting load 50 is connected to the inverter circuit 100. A phase current flowing in the element and a voltage between terminals of the element through a voltage detector 11 and a current detector 12 are detected to obtain a correlation of an ON time of the element and a phase current value based on the current and the voltage which are detected.

7 Claims, 13 Drawing Sheets

METHOD OF INSPECTING POWER CONVERTER AND INSPECTING DEVICE

CROSS-REFERENCE TO RELATED APPLICATION

This application is based on and claims priority under 35 U.S.C. §119 from Japanese Patent Application No. 2009-123798 filed on May 22, 2009.

BACKGROUND OF THE INVENTION

1. Technical Field

The present invention relates to a method of inspecting a power converter which serves to inspect a power converter for driving a motor and an inspecting device.

2. Related Art

There is known a power converter for converting a power supplied from an external power supply and outputting a driving power to a motor. In the case in which it is inspected whether the power converter of this type is a good product or not, conventionally, a motor is actually connected and conducted to carry out the inspection. In order to carry out the inspection without using the motor, moreover, a loading device to be an identical electrical load to the motor is connected to an output side of the power converter and a simulated power device simulating an external power supply is connected to an input side of the power converter in some cases (for example, see JP-A-2005-160282).

A current and a voltage which are output by a power converter to a motor have various values depending on a driving condition (an output torque or a rotating speed) required for the motor. In the inspection of the power converter, therefore, an output corresponding to each of driving conditions is carried out to decide quality in order to inspect whether an output corresponding to various driving conditions of the motor can be performed or not. For this reason, there is a problem in that a long time is required for the inspection and a working burden is great.

SUMMARY OF THE INVENTION

Therefore, it is an object of the invention to quickly inspect quality of a power converter for converting a power supplied from an external power supply and outputting the converted power to a motor.

In order to solve the problem, according to a first aspect of the invention, there is provided a method for inspecting a power converter that converts a power supplied from an external power supply through a plurality of elements and outputs the converted power to a motor, the method including:

an active region calculating step of switching a conducting state of each of the elements in the power converter in accordance with a driving condition for defining an output torque and a rotating speed of the motor to operate the elements in a state that the motor is connected to the power converter so as to obtain an active region of an element to be inspected based on a phase current flowing in the element to be inspected and a voltage between terminals of the element to be inspected for one electrical angle cycle during the operation, a driving condition setting step of setting a driving condition for inspection corresponding to the active region of the element to be inspected which is obtained at the active region calculating step, an inspecting step of switching a conducting state of the element to be inspected in accordance with the driving condition for inspection which is set at the driving condition setting step in a state that an inspecting load is connected to the power converter, and an output value calculating step of obtaining a correlation of an ON time and a phase current value based on the phase current flowing in the element to be inspected and a voltage between the terminals of the element to be inspected at the inspecting step.

According to the method, the conducting state of the element is switched in accordance with the driving condition for inspection corresponding to the whole active region of the element to be inspected and the phase current flowing to the element to be inspected and the voltage between the terminals of the element are detected in a state that an inspecting load is connected to the power converter. Thus, the element of the power converter is inspected. Therefore, it is possible to quickly inspect quality of the element by using a single driving condition for inspection. Moreover, it is possible to carry out the inspection without using the motor in an operating environment which is substantially equal to the case in which a power is output to the motor. Consequently, a cost can be reduced. In the case in which the driving condition for inspection is set, furthermore, the active region of the element to be inspected is obtained from the phase current flowing to the element to be inspected when the conducting state of the element in the power converter is switched and the element is thus operated in accordance with a plurality of driving conditions for actually driving the motor and the voltage between the terminals of the element, and the driving condition for inspection is set to include the active region. Therefore, it is possible to accurately decide quality in the whole active region of the element to be inspected.

Moreover, according to a second aspect of the invention, there is provided an inspecting device connected to a power converter that converts a power supplied from an external power supply through a plurality of elements and outputs the converted power to a motor, the inspecting device including:

a conducting controller that switches a conducting state of each of the elements in the power converter in accordance with a driving condition for defining an output torque and a rotating speed of the motor, and switches the conducting state of an element to be inspected in the power converter in accordance with a driving condition for inspection in a state that an inspecting load is connected to the power converter, a detector for detecting a phase current flowing in the element to be inspected and a voltage between terminals of the element to be inspected, and an output value calculator for obtaining a correlation of an ON time and a phase current value of the element to be inspected based on a current and a voltage which are detected by the detector while the conducting controller controls in accordance with a driving condition for inspection, wherein the driving condition for inspection is arbitrarily programmable in accordance with the active region of the element to be inspected.

Further, the driving condition for inspection may correspond to the whole active region of the element to be inspected.

According to the structure, the element of the power converter is inspected through the switching of the conducting state of the element in accordance with the driving condition for inspection which is arbitrarily programmable in accordance with the active region of the element to be inspected or the driving condition for inspection which corresponds to the whole active region of the element to be inspected and the detection of the phase current flowing to the element to be inspected and the voltage between the terminals of the element. Therefore, it is possible to quickly inspect quality of the element by using a single driving condition for inspection.

According to a third aspect of the invention, there is provided the inspecting device as in the second aspect, wherein the driving condition for inspection is set to include an active region of the element to be inspected which is obtained from the phase current flowing in the element to be inspected and the voltage between the terminals of the element during one electrical angle cycle in the case that the conducting controller switches the conducting state of each of the elements in the power converter to operate the elements in accordance with a plurality of driving conditions for driving the motor.

In this case, the active region of the element to be inspected is obtained from the phase current flowing to the element to be inspected when switching the conducting state of the element in the power converter and thus operating the element in accordance with the driving conditions for actually driving the motor and the voltage between the terminals of the element, and the inspection is carried out by using the driving condition for inspection which is determined to include the active region. Therefore, it is possible to decide quality in the whole active region of the element to be inspected more accurately depending on a single driving condition for inspection.

The active region of the element to be inspected includes all of correlations of the ON time of the element to be inspected and a value of the phase current which are obtained from the phase current flowing to the element and the voltage between the terminals of the element in the case in which the conducting controller operates the power converter by using a plurality of driving conditions, and can be set to be defined as a phase current value corresponding to the ON time of the element. In this case, the correlation of the ON time of the element and the phase current value is obtained from the phase current flowing to the element and the voltage between the terminals of the element and the active region is defined based on the correlation. Therefore, it is possible to accurately obtain all of the active regions as a sum of the active regions of the element corresponding to the driving conditions. Thus, it is possible to properly set the driving condition for inspection by using the active region. Consequently, it is possible to carry out a more accurate inspection.

Furthermore, the inspecting load can have a structure to include a stator of the motor in place of the motor. In this case, it is possible to carryout an inspection without actually operating the motor by using the inspecting load including only the stator of the motor. Thus, it is possible to relieve a working burden in the inspection and to reduce a cost. In addition, it is possible to inspect the power converter without using the motor in an operating environment which is substantially equal to the case in which a power is output to the motor.

According to a fourth aspect of the invention, there is provided the inspecting device as in the second aspect, wherein the correlation between the ON time and the phase current value of the element to be inspected which are obtained by the output value calculator is output as visual information.

In this case, it is possible to output the operating state of the element to be inspected in the inspection so as to be easily understood, and to understand the state of the power converter to be inspected intuitively. By visualizing the correlation of the ON time of the element and the phase current value, moreover, it is possible to easily find an operating failure which is hard to find by simply monitoring a value of a current flowing to the element and a voltage value.

According to a fifth aspect of the invention, there is provided the inspecting device as in the second aspect, wherein the conducting controller switches the conducting state of the element to be inspected so that the phase current flowing in the element to be inspected increases continuously from zero in accordance with the driving condition for inspection.

In this case, by switching the conducting state of the element to be inspected in such a manner that the current value of the phase current is increased continuously from zero in accordance with the driving condition for inspection, it is possible to carry out the inspection without an omission in the whole active region of the element to be inspected.

According to a sixth aspect of the invention, there is provided the inspecting device as in the second aspect, wherein the conducting controller switches the conducting state of the element to be inspected so that a phase difference between the phase current flowing in the element to be inspected and the phase voltage of the element to be inspected is $\pi/2$.

In this case, it is possible to variously change the ON time of the element by setting the phase difference between the phase current and the phase voltage to be $\pi/2$. Therefore, it is possible to reliably carry out the inspection in accordance with the driving condition for inspection.

According to the invention, the element of the power converter is inspected through the switching of the conducting state of the element in accordance with the driving condition for inspection corresponding to the whole active region of the element to be inspected and the detection of the phase current flowing to the element to be inspected and the voltage between the terminals of the element. Therefore, it is possible to quickly inspect the quality of the element by using a single driving condition for inspection.

According to the invention, moreover, it is possible to decide the quality in the whole active region of the element to be inspected more accurately depending on the single driving condition for inspection.

According to the invention, by carrying out the visualization as the correlation of the ON time of the element and the phase current value, it is possible to easily find an operating failure which is hard to find from only the current flowing to the element and the voltage.

According to the invention, by switching the conducting state of the element to be inspected in such a manner that the current value of the phase current is increased continuously from zero in accordance with the driving condition for inspection, it is possible to carry out the inspection without an omission in the whole active region of the element to be inspected.

According to the invention, it is possible to variously change the ON time of the element by setting the phase difference between the phase current and the phase voltage to be $\pi/2$. Therefore, it is possible to reliably carry out the inspection in accordance with the driving condition for inspection.

BRIEF DESCRIPTION OF THE DRAWINGS

A general architecture that implements the various features of the invention will now be described with reference to the drawings. The drawings and the associated descriptions are provided to illustrate embodiments of the invention and not limited the scope of the invention.

DETAILED DESCRIPTION OF THE PREFERRED EMBODIMENTS

Various embodiments according to the invention will be described hereinafter with reference to the accompanying drawings. In general, according to one embodiment of the invention, an information processing apparatus and a control method which can automatically execute a predetermined program when an operator is absent.

An embodiment according to the invention will be described below with reference to the drawings.

Figure 1:
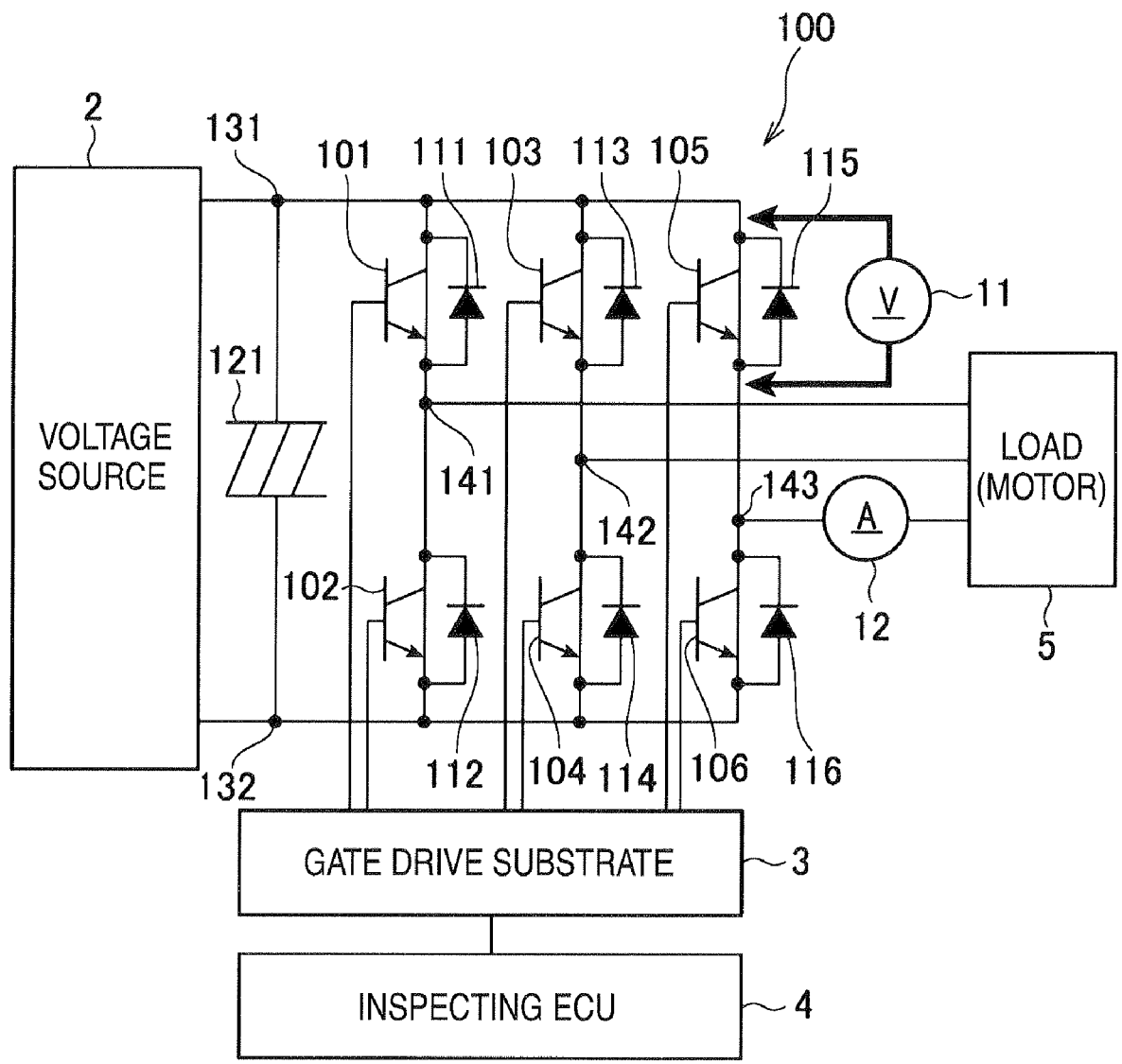
FIG. 1 is a circuit diagram showing a structure of an inverter circuit according to an embodiment.
Figure 2:
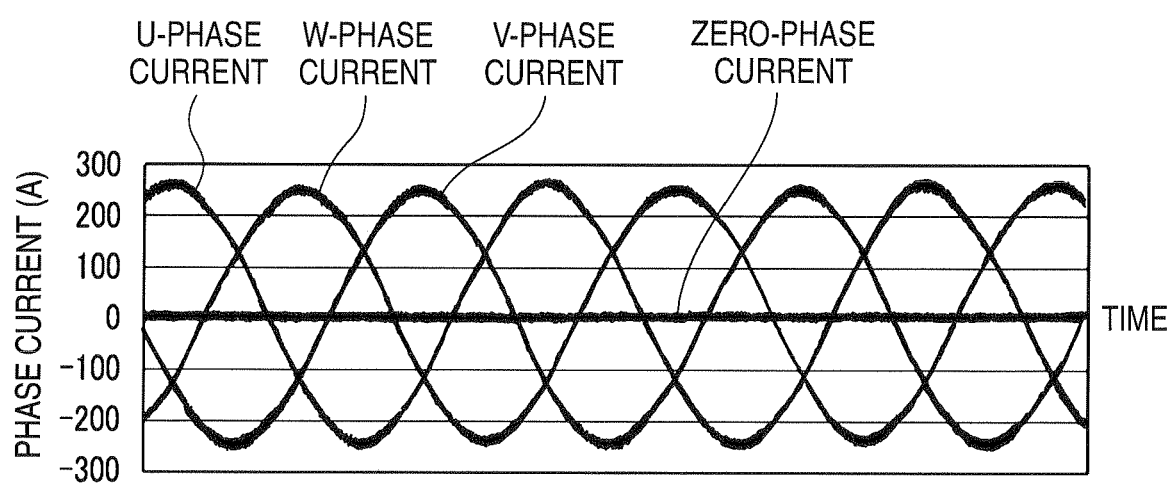
FIG. 2 is a chart showing a phase current flowing to an inverter circuit.

FIG. 1 is a circuit diagram showing a structure of an inverter circuit 100 according to the embodiment of the invention. Moreover, FIG. 2 is a chart showing an output current which is output from the inverter circuit 100 to a motor 5, in which an axis of ordinate indicates a current value and an axis of abscissa indicates a passage of time.

A voltage source 2 (an external power supply) to be a DC voltage source is connected to a high voltage side input terminal 131 and a low voltage side input terminal 132 and the three-phase AC motor 5 serving as a load is connected to an output side in the inverter circuit 100. The inverter circuit 100 is a three-phase output inverter circuit for converting a DC voltage supplied from the voltage source 2 into a three-phase AC voltage by using six switching elements and outputting the three-phase AC voltage from a U-phase output terminal 141, a V-phase output terminal 142 and a W-phase output terminal 143 to the three-phase AC motor 5. The inverter circuit 100 outputs U-phase, V-phase and W-phase AC currents having phases shifted by 120° as shown in FIG. 2.

The inverter circuit 100 in FIG. 1 includes six IGBTs 101 to 106 serving as switching elements. A gate drive (GD) substrate 3 is connected to gate terminals of the IGBTs 101 to 106, and the GD substrate 3 can supply a gate voltage to each of the IGBTs 101 to 106. The gate voltage to be supplied to the IGBTs 101 to 106 is turned ON/OFF to switch the IGBTs 101 to 106.

An inspecting ECU 4 is an inspecting computer which has a CPU, an RAM and an ROM which are not shown and in which the CPU executes a program stored in the ROM to control the GD substrate 3, thereby carrying out switching for each element in the inverter circuit 100. The inspecting ECU 4 controls a duty of ON and OFF times of the IGBTs 101 to 106 through the GD substrate 3, thereby carrying out a PWM (Pulse Width Modulation) control of the motor 5. Information including at least a rotating speed and an output torque of the motor 5 is input as a driving condition for operating the motor 5 to the inspecting ECU 4 or is preset. The inspecting ECU 4 carries out the PWM control in such a manner that the rotating speed and the output torque in the motor 5 are coincident with the driving condition.

The inspecting ECU 4 functions as an inspecting device according to the invention together with the GD substrate 3. In this case, the inspecting ECU 4 is equivalent to a conducting controller and an output value calculator.

The IGBT 101 of the inverter circuit 100 is connected between the high voltage side input terminal 131 and the U-phase output terminal 141 and the IGBT 102 is connected between the U-phase output terminal 141 and the low voltage side input terminal 132, and the U-phase current is output through the IGBTs 101 and 102. Moreover, the IGBT 103 is connected between the high voltage side input terminal 131 and the V-phase output terminal 142 and the IGBT 104 is connected between the V-phase output terminal 142 and the low voltage side input terminal 132, and the V-phase current is output through the IGBTs 103 and 104. The IGBT 105 is connected between the high voltage side input terminal 131 and the W-phase output terminal 143 and the IGBT 106 is connected between the W-phase output terminal 143 and the low voltage side input terminal 132, and the W-phase current is output to the motor 5 through the IGBTs 105 and 106.

Free wheeling diodes (which will be hereinafter referred to as FWDs) 111 to 116 are connected between collectors and emitters in the IGBTs 101 to 106, respectively. A current flows from the emitter side to the collector side in the IGBT through each of the FWDs 111 to 116 while the IGBT is OFF. The FWDs 111 to 116 function as elements according to the invention together with the IGBTs 101 to 106.

Moreover, a smoothing capacitor 121 is connected between the high voltage side input terminal 131 and the low voltage side input terminal 132 which are connected to the voltage source 2.

The inspecting ECU 4 can select and acquire an optional value from four combinations including a voltage between a collector and an emitter and a phase current in an HI arm, a voltage between a collector and an emitter and a phase current in an LO arm, a voltage between a gate and the emitter and a phase current in the HI arm, and a voltage between a gate and the emitter and a phase current in the LO arm. FIG. 1 shows, as an example, a circuit structure in the case in which the voltage between the collector and the emitter and the phase current in the HI arm are acquired.

With the structure shown in FIG. 1, a voltage detector 11 is connected between a collector and an emitter in the IGBT 105 and a current detector 12 is connected between the W-phase output terminal 143 and the motor 5. The voltage detector 11 detects a value of a voltage generated across the IGBT 105 and the FWD 115, and the current detector 12 detects a value of a phase current flowing between the W-phase output terminal 143 and the motor 5. The voltage detector 11 and the current detector 12 are connected to the inspecting ECU 4 and the detected values are acquired by the inspecting ECU 4. The voltage detector 11 and the current detector 12 are equivalent to a detector according to the application.

In addition to the structure shown in FIG. 1, it is also possible to provide the voltage detector 11 and the current detector 12 in the other parts of the inverter circuit 100, thereby acquiring a voltage between a gate and the emitter and a phase current in the IGBT 105, or to acquire voltages between the collectors and the emitters and phase currents or voltages between gates and the emitters and phase currents in the IGBTs 101 to 104 and 106. More specifically, it is also possible to provide the voltage detector 11 for detecting a voltage between the collector and the emitter or a voltage between the gate and the emitter in the IGBTs 101 to 104 and 106 and to provide the current detector 12 between the U-phase output terminal 141 and the motor 5 and between the V-phase output terminal 142 and the motor 5. The voltage detector 11 and the current detector 12 are connected to the inspecting ECU 4.

In the embodiment, each element constituting the inverter circuit 100 is inspected through a control of the inspecting ECU 4.

First of all, description will be given to steps to be carried out until an inspecting condition is set.

FIGS. 3A to 3D are diagrams showing switching a state of the IGBTs 101 to 106 in a driving operation of the motor 5, illustrating the switching state of the IGBTs 105 and 106 for outputting the W-phase current as an example. The IGBTs 101 and 102 for outputting the U-phase current, the FWDs 111 and 112 and the IGBTs 103 and 104 for outputting the V-phase current, and the FWDs 113 and 114 are also operated in the same manner.

Figure 3A:
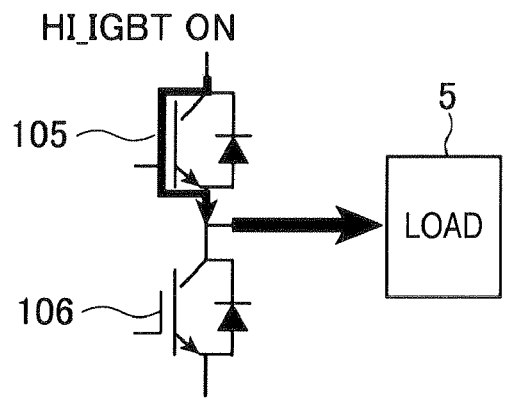
FIGS. 3A to 3D are diagrams showing switching state of each element in the inverter circuit when a motor is driven.
Figure 3B:
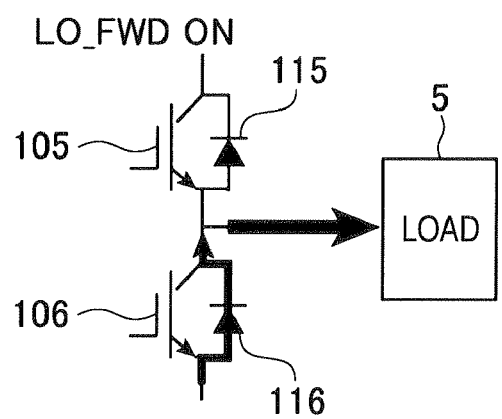
Figure 3C:
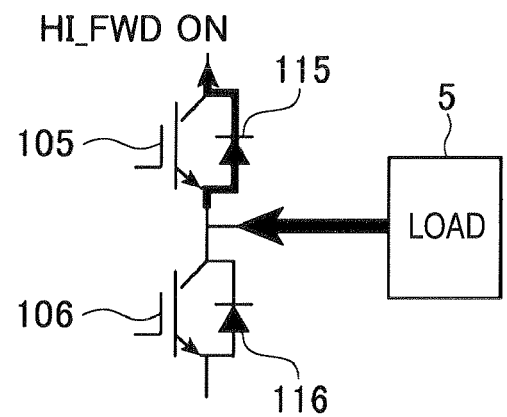
Figure 3D:
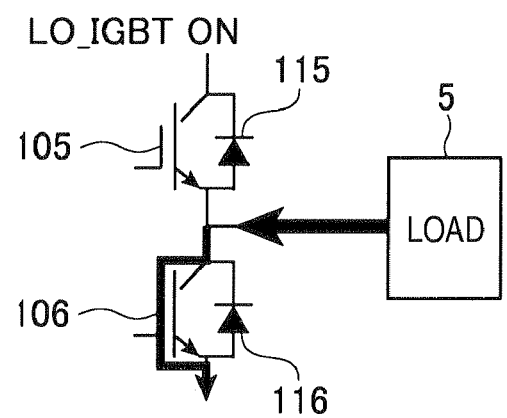

FIGS. 3A and 3B show a state that the phase current flows from the inverter circuit 100 to the motor 5 and FIGS. 3C and 3D show a state that the current flows from the motor 5 to the inverter circuit 100.

In the states shown in FIGS. 3A and 3B, the W-phase current flowing from the inverter circuit 100 to the motor 5 is larger than zero. As shown in FIGS. 3A and 3B, the phase current flows from the IGBT 105 to the motor 5 while the IGBT 105 of the HI arm is ON, and the W-phase current flows to the motor 5 via the FWD 116 connected to the IGBT 106 of the LO arm while the IGBT 105 is OFF. On the other hand, the phase current flows from the motor 5 to the IGBT 106 while the IGBT 106 of the LO arm is ON and the current flows from the motor 5 to the FWD 115 of the HI arm when the IGBT 106 is OFF as shown in FIGS. 3C and 3D when the current flows from the motor 5, that is, the phase current flowing from the inverter circuit 100 to the motor 5 is smaller than zero.

One electrical angle cycle of the phase current (0° to 360°) has a period of the phase current>0 and a period of the phase current<0. For the period of the phase current>0, the current flows as shown in FIGS. 3A and 3B. For the period of the phase current<0, the current flows as shown in FIGS. 3C and 3D. In other words, the IGBTs 105 and 106 and the FWDs 115 and 116 are successively switched and operated for a period corresponding to one electrical angle cycle.

Figure 4:
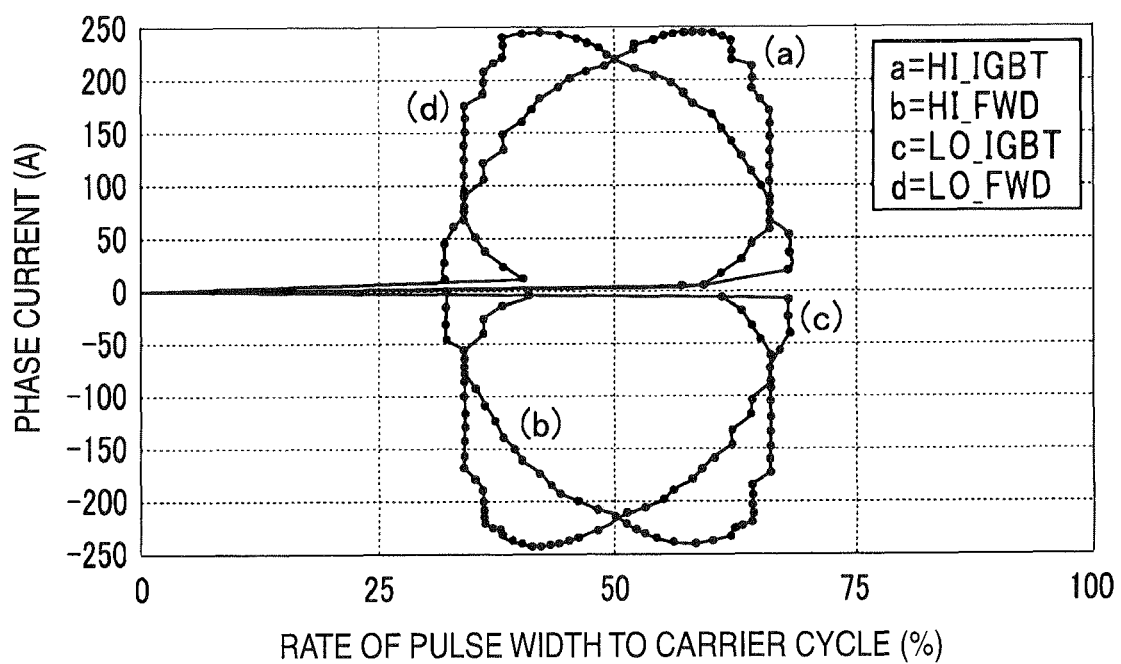
FIG. 4 is a chart in which a correspondence of a value of a phase current flowing to the element in the driving operation of the motor to a pulse width is plotted.

FIG. 4 is a chart in which a correspondence of a value of a phase current flowing to each element in a driving operation of the motor 5 to a pulse width is plotted, illustrating phase current values in the IGBTs 105 and 106 for outputting the W-phase current and the FWDs 115 and 116 as an example.

In graphs (a) to (d) in FIG. 4, a correlation of the phase current value corresponding to one electrical angle cycle to the pulse width is obtained based on the voltage value detected by the voltage detector 11 (FIG. 1) connected between the collector and the emitter of the IGBTs 105 and 106 and the value of the phase current flowing between the W-phase output terminal 143 and the motor 5 which is detected by the current detector 12 (FIG. 1) during the driving operation of the motor 5 on a predetermined driving condition, and is thus plotted. An axis of abscissa indicates a rate (%) of the pulse width to a carrier cycle. For the value of the phase current, a driving current flowing from the W-phase output terminal 143 to the motor 5 is represented by a positive value and a current flowing from the motor 5 to the inverter circuit 100 is represented by a negative value.

In FIG. 4, (a) denotes a phase current flowing to the IGBT 105, (b) denotes a phase current flowing to the FWD 115, (c) denotes a phase current flowing to the IGBT 106, and (d) denotes a phase current flowing to the FWD 116.

The graphs (a) to (d) indicate active regions of the IGBTs 105 and 106 and the FWDs 115 and 116 in one electrical angle cycle corresponding to the predetermined driving condition of the motor 5. For example, in the case in which the motor 5 is driven on the predetermined driving condition, the IGBT 105 is required to have a performance for outputting at least a current value on a graph (a) line in a pulse width in a region surrounded by the graph (a). The IGBT 106 and the FWDs 115 and 116 are the same.

Thus, it is possible to obtain an active region of each of the elements (the IGBTs 101 to 106 and the FWDs 111 to 116) in the inverter circuit 100 for each driving condition of the motor 5 based on the values detected by the voltage detector 11 and the current detector 12 in one electrical angle cycle.

Figure 5:
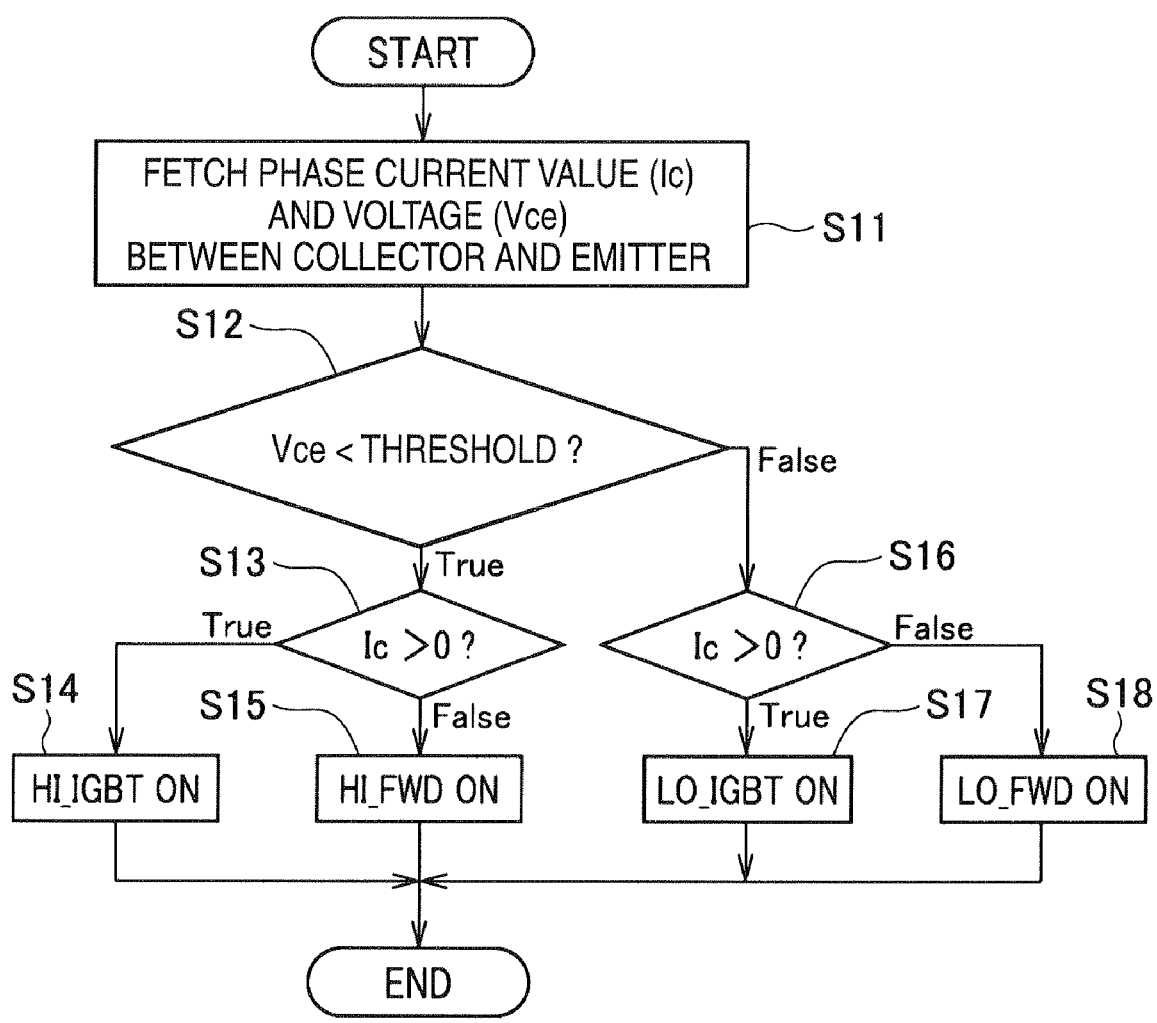
FIG. 5 is a flowchart showing an operation for obtaining the switching state of the element from a current value and a voltage value.
Figure 6:
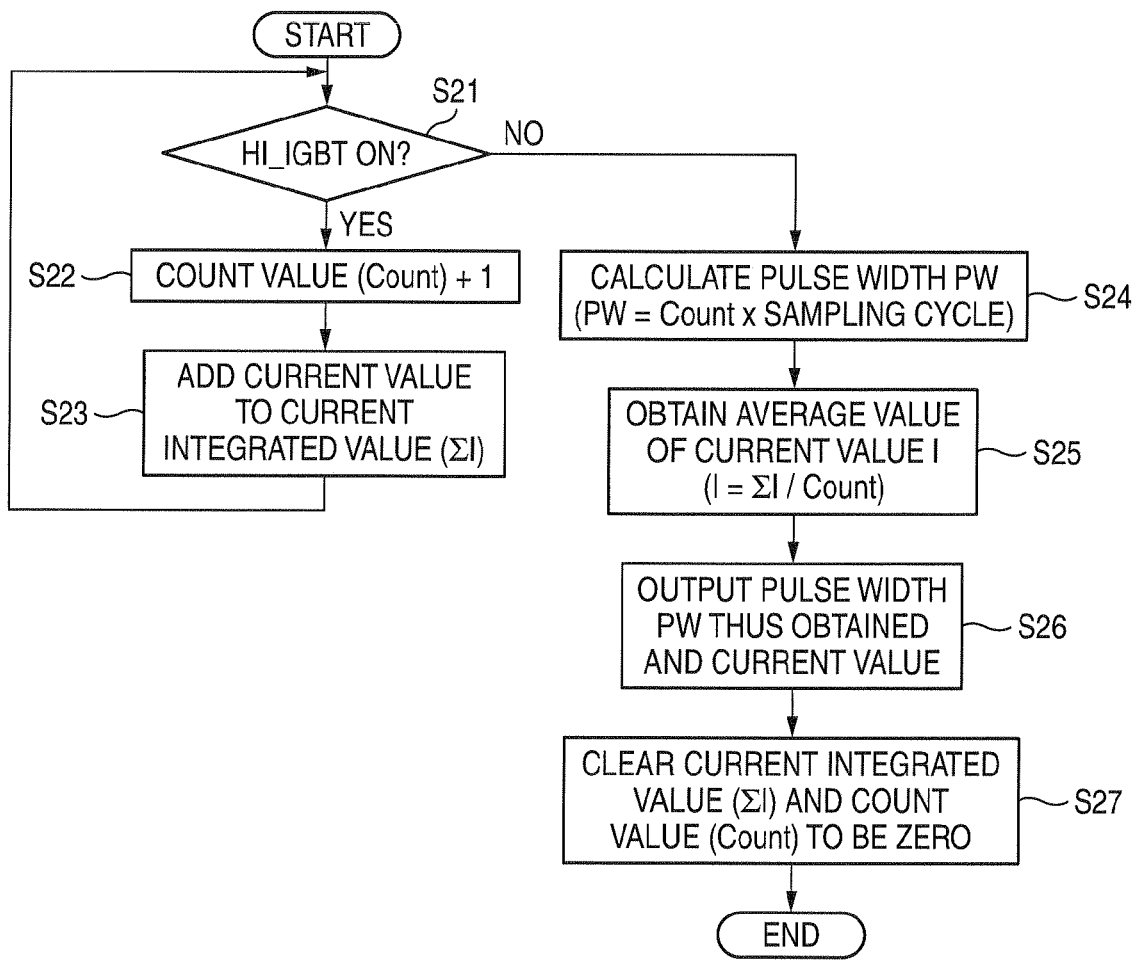
FIG. 6 is a flowchart showing an operation for obtaining a correspondence of the value of the phase current flowing to the element to the pulse width.

FIG. 5 is a flowchart showing an operation for the inspecting ECU 4 to obtain a switching state of each element from the values detected by the voltage detector 11 and the current detector 12. Moreover, FIG. 6 is a flowchart showing an operation for obtaining a correspondence of a value of a phase current flowing to each of the elements to a pulse width.

There will be illustrated the case in which each of the elements, that is, the IGBTs 105 and 106 for outputting the W-phase current and the FWDs 115 and 116 is referred. Referring to the elements for outputting the U-phase current and the V-phase current, the same operation is executed.

The inspecting ECU 4 cyclically fetches a voltage (Vce) between a collector and an emitter in the IGBT which is detected by the voltage detector 11 and a phase current value (Ic) detected by the current detector 12 in accordance with a predetermined sampling frequency (Step S11).

The inspecting ECU 4 fetching the detected voltage and the phase current value decides whether the detected voltage (Vce) has a smaller value than a threshold or not (Step S12). If the detected voltage (Vce) is lower than the threshold (Step S12; True), it is decided whether the phase current value (Ic) is a positive value or a negative value (Step S13). If the phase current (Ic) is the positive value (Step S13; True), the inspecting ECU 4 decides that the IGBT 105 of the HI arm is ON (Step S14). If the phase current value (Ic) is the negative value (Step S13; False), it is decided that the FWD 115 of the HI arm is ON (Step S15).

If the detected voltage (Vce) is equal to or higher than the threshold (Step S12; False), moreover, it is decided whether the phase current value (Ic) is a positive value or a negative value (Step S16). If the phase current value (Ic) is the positive value (Step S16; True), the inspecting ECU 4 decides that the IGBT 106 of the LO arm is ON (Step S17). If the phase current value (Ic) is the negative value (Step S16; False), it is decided that the FWD 116 of the LO arm is ON (Step S18).

As shown in FIGS. 3A to 3D, the respective elements of the IGBTs 105 and 106 and the FWDs 115 and 116 are complementarily operated. By the operation in FIG. 5, therefore, it is possible to specify any of the elements which is turned ON in a timing for detecting the voltage value detected by the voltage detector 11 and the phase current value detected by the current detector 12 based on the detected values.

An operation shown in FIG. 6 is executed subsequently to the operation in FIG. 5. The operation in FIG. 6 is executed for a single element. Actually, the operation in FIG. 6 is independently executed for each of six IGBTs 101 to 106 and six FWDs 111 to 116 which are provided in the inverter circuit 100. Description will be given by taking an operation related to the IGBT 105 as an example.

The inspecting ECU 4 decides whether the IGBT 105 is ON or not through the operation in FIG. 5 (Step S21). If the IGBT 105 is ON, a count value (Count) is incremented (+1) (Step S22) and the current value fetched at the Step S11 in FIG. 5 is added to a current integrated value (Step 23). Then, the processing returns to the Step S21. The count value is counted up every sampling and the current integrated value is added for a period for which it is decided that the IGBT 105 is continuously ON while the operation in FIG. 5 is repetitively executed in a predetermined sampling cycle through the operations of the Steps S21 to S23.

If it is not decided that the IGBT 105 is ON (Step S21; No), the inspecting ECU 4 multiplies the count value (Count) for the operation of the IGBT 105 by a sampling cycle to calculate a period for which the IGBT 105 is continuously ON, that is, a pulse width (Step S24). Subsequently, the inspecting ECU 4 divides the current integrated value by the count value, thereby obtaining an average value of the current value (Step S25), outputs the pulse width and the average value of the current value thus obtained to a display device (not shown) or an external connected device (not shown) (Step S26) and clears the current integrated value and the count value (Step S27) so that the processing is ended. After the processing is ended, the processing of FIG. 6 related to the IGBT 105 is repetitively executed from the Step S21.

Figure 7:
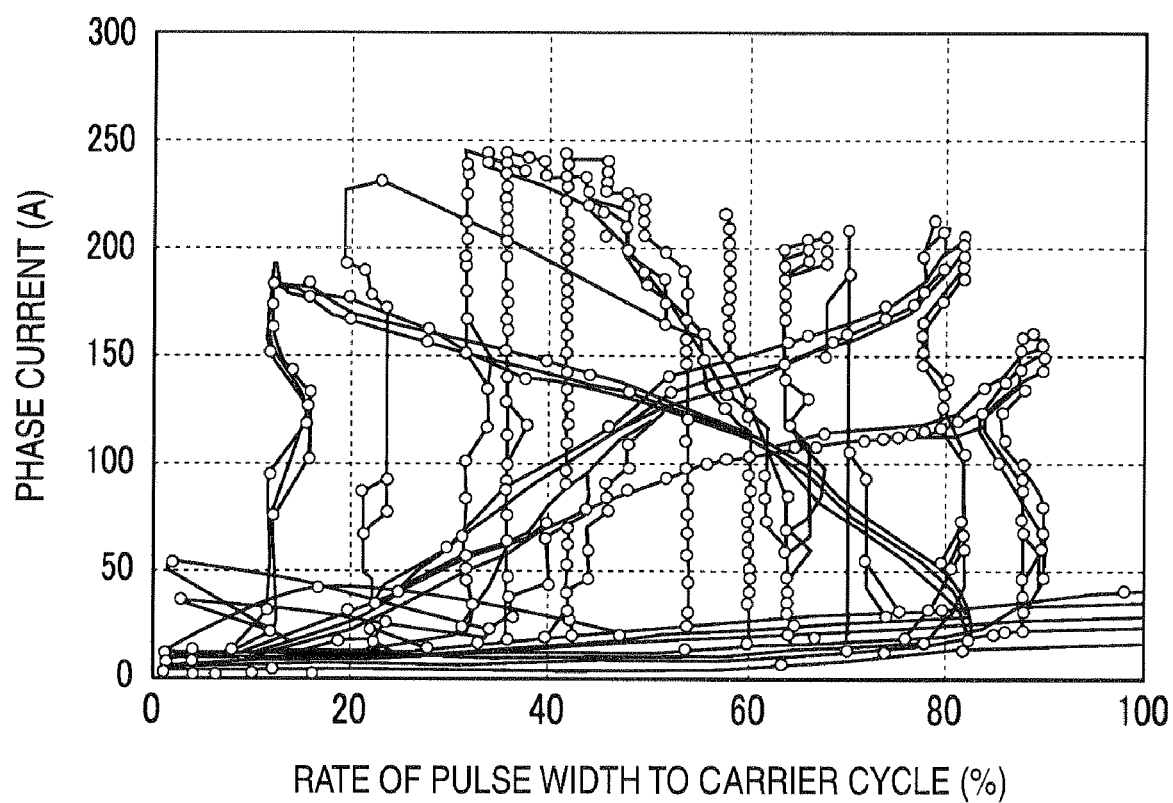
FIG. 7 is a chart in which a correspondence of a value of a phase current flowing to the element in a driving operation of the motor on a plurality of driving conditions to a pulse width is plotted.

The inspecting ECU 4 acquires the values detected by the voltage detector 11 and the current detector 12 corresponding to one electrical angle cycle to carry out the operations in FIGS. 5 and 6 while driving the motor 5 on the predetermined driving condition, thereby obtaining a plot, of the current flowing to each element in one electrical angle cycle and the pulse width. FIG. 7 shows the plot obtained by the function of the inspecting ECU 4.

Figure 8:
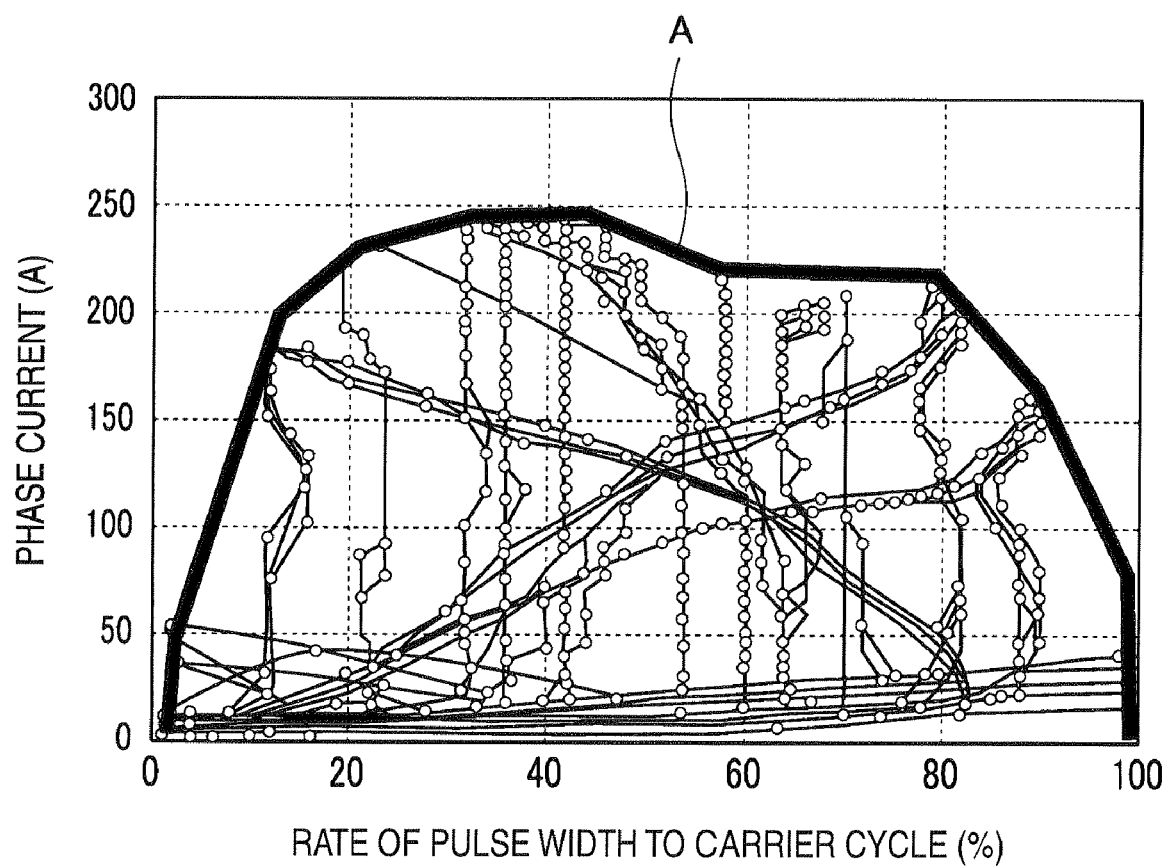
FIG. 8 is a chart showing a state that an active region is obtained from the correspondence of the phase current value to the pulse width.
Figure 9:
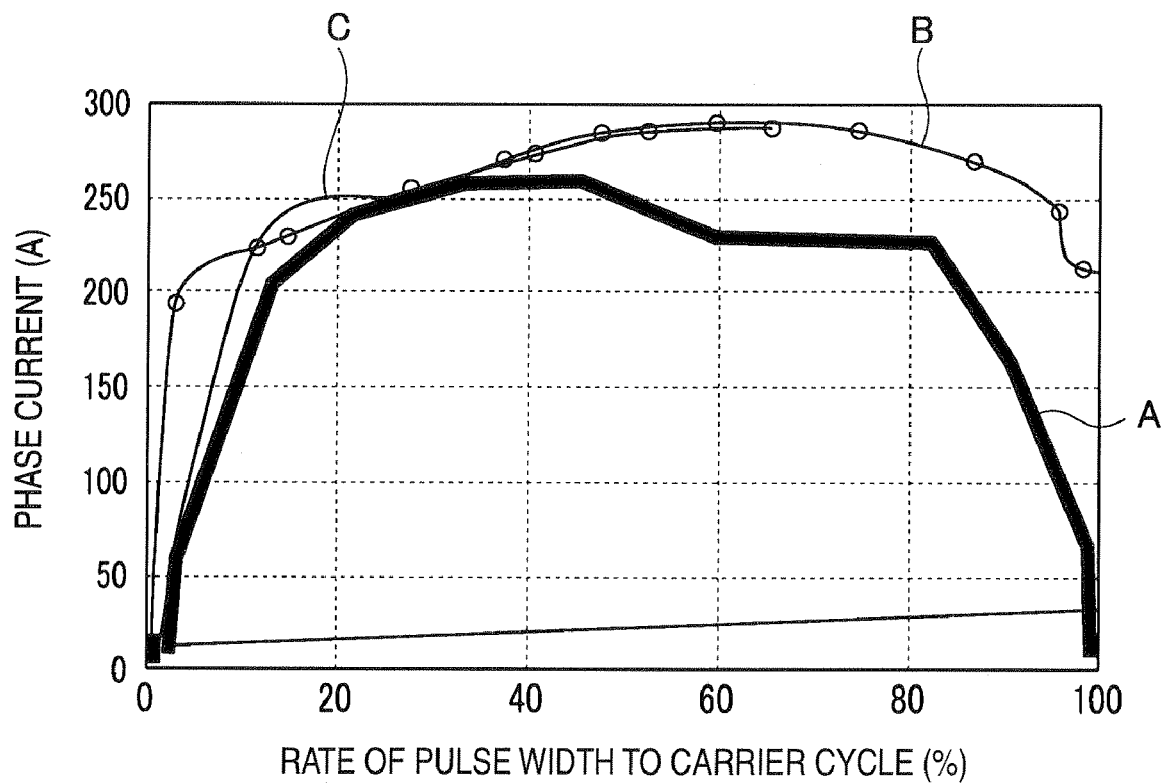
FIG. 9 is a chart showing an example of an inspecting condition determined based on the active region.

FIG. 7 is a chart in which a correspondence of a value of a phase current flowing to the IGBT 105 in the case in which the motor 5 is driven on a plurality of driving conditions to the pulse width is plotted every driving condition. An axis of abscissa indicates the pulse width as a rate (%) of the pulse width with respect to a carrier cycle. The chart in FIG. 7 can be created for each of the other elements provided in the inverter circuit 100. Herein, a chart related to the IGBT 105 is taken as an example. FIGS. 8 and 9 which will be described below are also the same.

As shown in FIG. 7, the pulse width and the current value have various correlations for each of the driving conditions of the motor 5. The IGBT 105 is required to be normally operated on various driving conditions of the motor 5. For this reason, it is necessary to carry out the normal operation in a region including all the plots in FIG. 7.

In order to carry out an inspection in the active region of the IGBT 105, the correlation of the pulse width and the current value in the case in which the inverter circuit 100 is operated in accordance with the main driving condition of the motor 5 is plotted as shown in FIG. 7, and a range including all the plots is obtained as the active region of the IGBT 105.

FIG. 8 is a chart showing a state that the active region of the IGBT 105 is obtained through the correspondence of the value of the phase current flowing to the IGBT 105 and the pulse width.

The correlation of the pulse width and the current value in the case in which the inverter circuit 100 is operated in accordance with the main driving condition of the motor 5 is plotted in a graph of the pulse width-phase current value, and a region surrounding all the plots is obtained. Consequently, the same region is equivalent to the active region of the IGBT 105. In the example of FIG. 8, a maximum current value for each pulse width is connected to draw a maximum current value line (the designation A in the drawing) so that a region placed under the maximum current value line A can be set to be the active region of the IGBT 105.

FIG. 9 is a chart showing an example of an inspecting condition determined based on the active region of the IGBT 105.

In the case in which it is inspected whether an element to be inspected (the IGBT 105) normally functions in the whole active region or not, it is sufficient that a current exceeding the maximum current value line A is caused to flow in a whole area of the pulse width in the active region to enable an inspection for a behavior of the element. In the example of FIG. 9, both driving conditions B and C exceeding the maximum current value line A in a whole region having a rate of 0 [%] to 100 [%] of the pulse width with respect to a carrier cycle are suitable for a driving condition for inspecting the IGBT 105.

The step of obtaining the driving condition for inspection as described with reference to FIGS. 7 to 9 is also carried out for the IGBT 106 and the FWDs 115 and 116, and a common driving condition for inspection which satisfies all inspecting conditions of the respective elements is obtained and set to the inspecting ECU 4. For example, the respective elements of the IGBTs 105 and 106 and the FWDs 115 and 116 are operated in relation to each other. Therefore, a current is caused to flow in each of the elements based on a single inspecting condition so that the inspection is carried out at the same time. For this reason, four driving conditions for inspection which cover the active regions of the four elements respectively are obtained and a driving condition satisfying the four driving conditions for inspection is then set to be a driving condition for inspection of a W-phase. Similarly, inspecting conditions are also determined for the four elements for outputting the U-phase current and the four elements for outputting the V-phase current in the inverter circuit 100, respectively.

The driving condition set at the step takes a configuration of information which includes the rotating speed and the output torque in the motor 5. For this reason, the inverter circuit 100 can be controlled in the inspection based on the driving condition for inspection in the same manner as in the case in which the inspecting ECU 4 drives the motor 5.

Next, description will be given to the inspection to be carried out in accordance with the driving condition for inspection.

Figure 10:
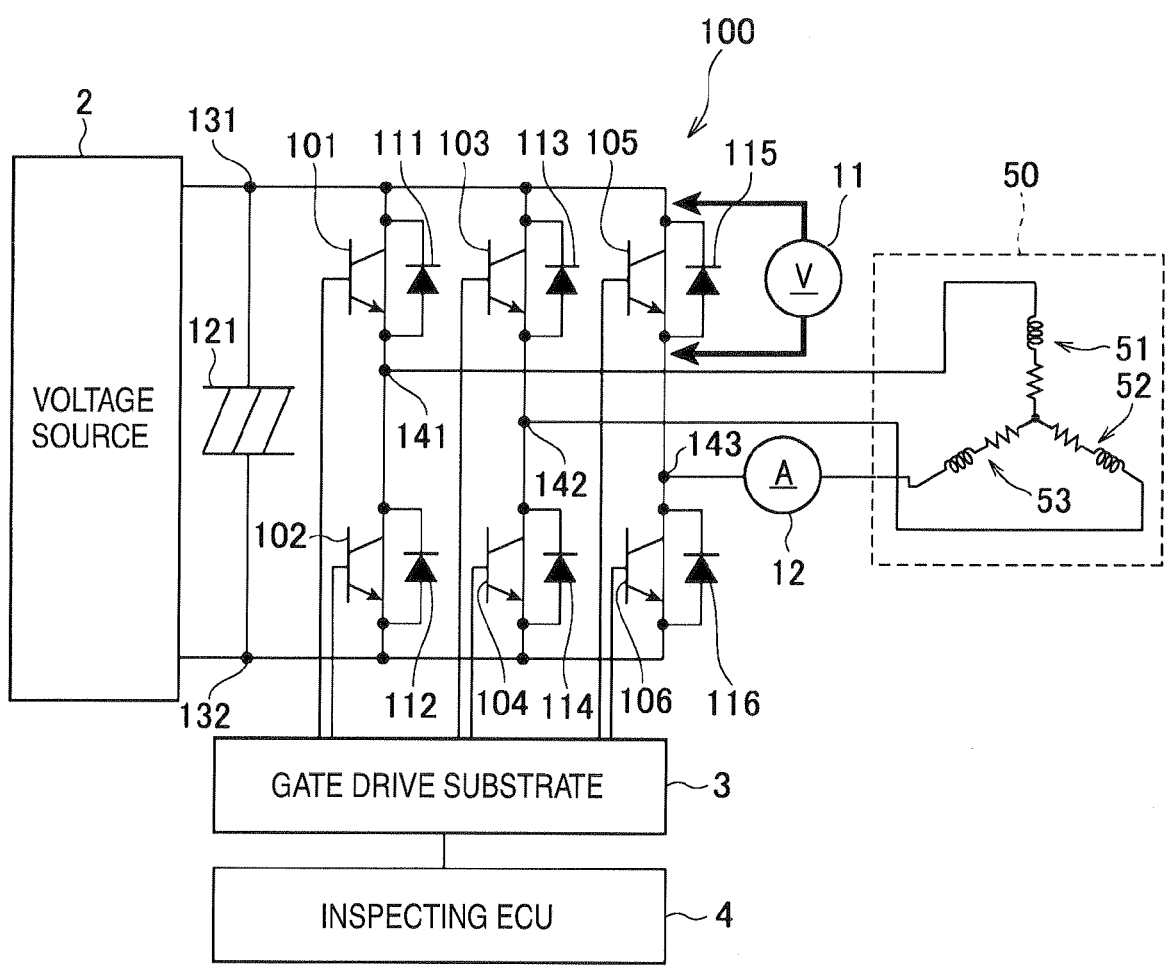
FIG. 10 is a circuit diagram showing a structure in the case in which the inverter circuit is inspected by applying the invention.

FIG. 10 is a circuit diagram showing a structure in the case in which the invention is applied to inspect the inverter circuit 100.

In the inspection, the voltage source 2 is connected to the input side of the inverter circuit 100, while an inspecting load 50 is connected to the output side in place of the motor 5. The inspecting load 50 is a circuit including only stators 51, 52 and 53 of the motor 5. The stators 51, 52 and 53 are connected to the U-phase output terminal 141, the V-phase output terminal 142 and the W-phase output terminal 143 in the inverter circuit 100, respectively.

Moreover, the inverter circuit 100 is provided with the voltage detector 11 for detecting a voltage value between the collector and the emitter in the IGBT 105, and the current detector 12 for detecting a value of a phase current flowing between the W-phase output terminal 143 and the inspecting load 50.

The inspecting ECU 4 drives the GD substrate 3 to switch the IGBTs 101 to 106. Consequently, the phase current is caused to flow in each element in accordance with a set driving condition for inspection, thereby inspecting each element in the inverter circuit 100, and furthermore, outputting a result of the inspection which serves to decide quality of the element based on values detected by the voltage detector 11 and the current detector 12 during the inspection.

Figure 11:
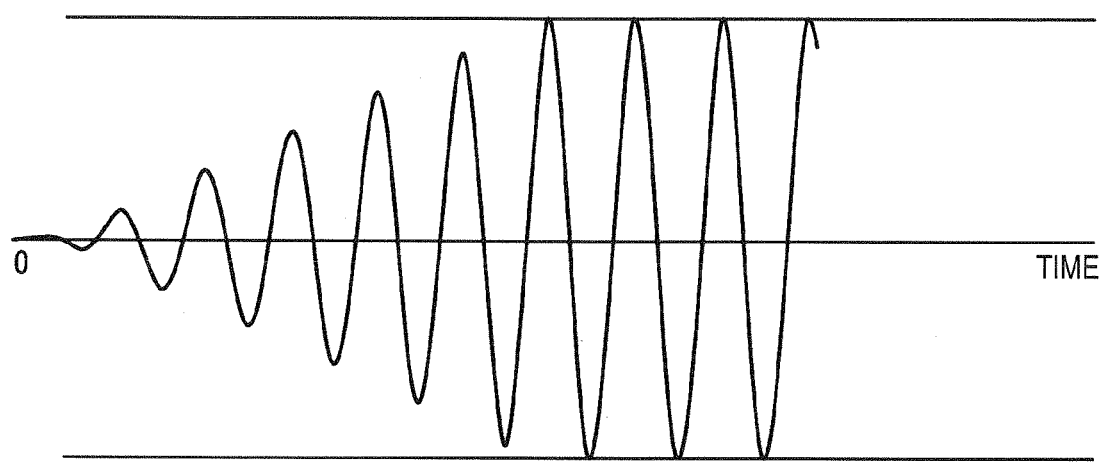
FIG. 11 is a chart showing a change in a phase current in an inspection.

FIG. 11 is a chart showing a change in the phase current in the inspection.

The inspecting ECU 4 controls the GD substrate 3 in accordance with the set driving condition for inspection, thereby carrying out a control for causing a phase current having a phase (a W-phase) to be inspected to flow. The inspecting ECU 4 gradually increases an amplitude (a current value) of the phase current to be inspected which flows to the inverter circuit 100 from zero as shown in FIG. 11.

Moreover, the inspecting ECU 4 controls the GD substrate 3 in such a manner that phases of a phase current and a phase voltage to be inspected which are output to the inspecting load 50 are shifted by almost π/2 while the phase current is caused to flow in accordance with the driving condition for inspection. A phase difference θ in a conduction of the stator can be obtained in accordance with the following equation (1), wherein an inductance, a resistance value and an angular frequency of a phase current in the stator (the stator 53) of the inspecting load 50 from which the phase current to be inspected is output are represented by L, R and ω, respectively. The conduction of the stator indicates that a power conversion is carried out in a state that the load to be connected to the inverter circuit 100 is set to be only an L load having three phases excluding a rotor (for example, the inspecting load 50).

$$\theta[\text{rad}] = \tan^{-1}(\omega L/R) \quad (1)$$

The phase difference θ in the conduction of the stator in the Equation (1) can take a value of 0 to π/2 and converges on π/2 with an increase in ω, that is, the angular frequency of the phase current. For this reason, the inspecting ECU 4 controls the GD substrate 3 to increase the frequency of the phase current, thereby setting the phase difference between the phase current and the phase voltage to be almost π/2. In the case in which the motor 5 is driven by the inverter circuit 100, the phase difference between the phase voltage and the phase current can be operated to have 0 to 2π in accordance with a command of the inspecting ECU 4 and a state that the phase difference is π/2 is equivalent to a state that a current flows in a d-axis direction (magnetic flux direction) with respect to a magnetic pole position of the rotor.

When the phase difference is closer to zero than π/2, a period for which the current flows to the IGBT is prolonged. When the phase difference is closer to π than π/2, a period for which the current flows to the FWD is prolonged. By setting the phase difference to be π/2, therefore, it is possible to cause a phase current to flow in both the IGBT and the FWD in various current values and pulse widths, thereby carrying out the inspection. Therefore, it is desirable to increase the angular frequency, thereby maintaining the phase difference to be close to π/2 as described above while operating the inverter circuit 100 through the conduction of the stator in accordance with the driving condition for inspection.

Figure 12:
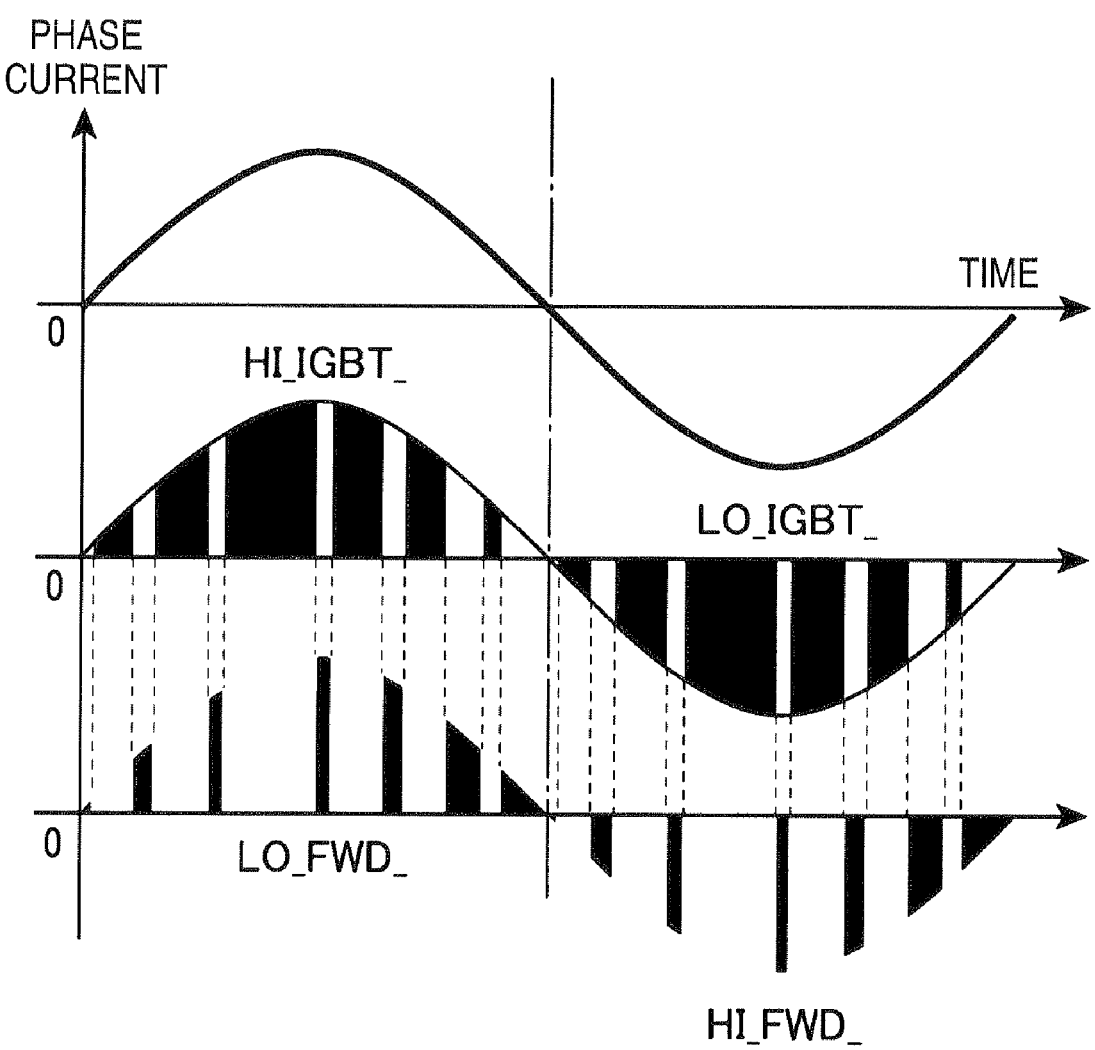
FIG. 12 is a chart showing a switching state of each element to be inspected.

FIG. 12 shows a change in a phase current in an inspection and a switching state of each element. In FIG. 12, a filled period indicates a period for which each element is ON.

The inspecting ECU 4 controls the GD substrate 3 to switch the element to which the phase current to be inspected flows, thereby changing over a time period (a pulse width) for which each element is ON in various lengths. In the example shown in FIG. 12, ON/OFF is switched in such a manner that an ON period of the IGBT 105 of the HI arm has various lengths for a period for which the phase current has a positive current value, and ON/OFF of the IGBT 106 of the LO arm is also switched for a period for which the current value is negative. Consequently, lengths (pulse widths) of the ON periods of the IGBTs 105 and 106 and the FWDs 115 and 116 are set to have various lengths.

Figure 13:
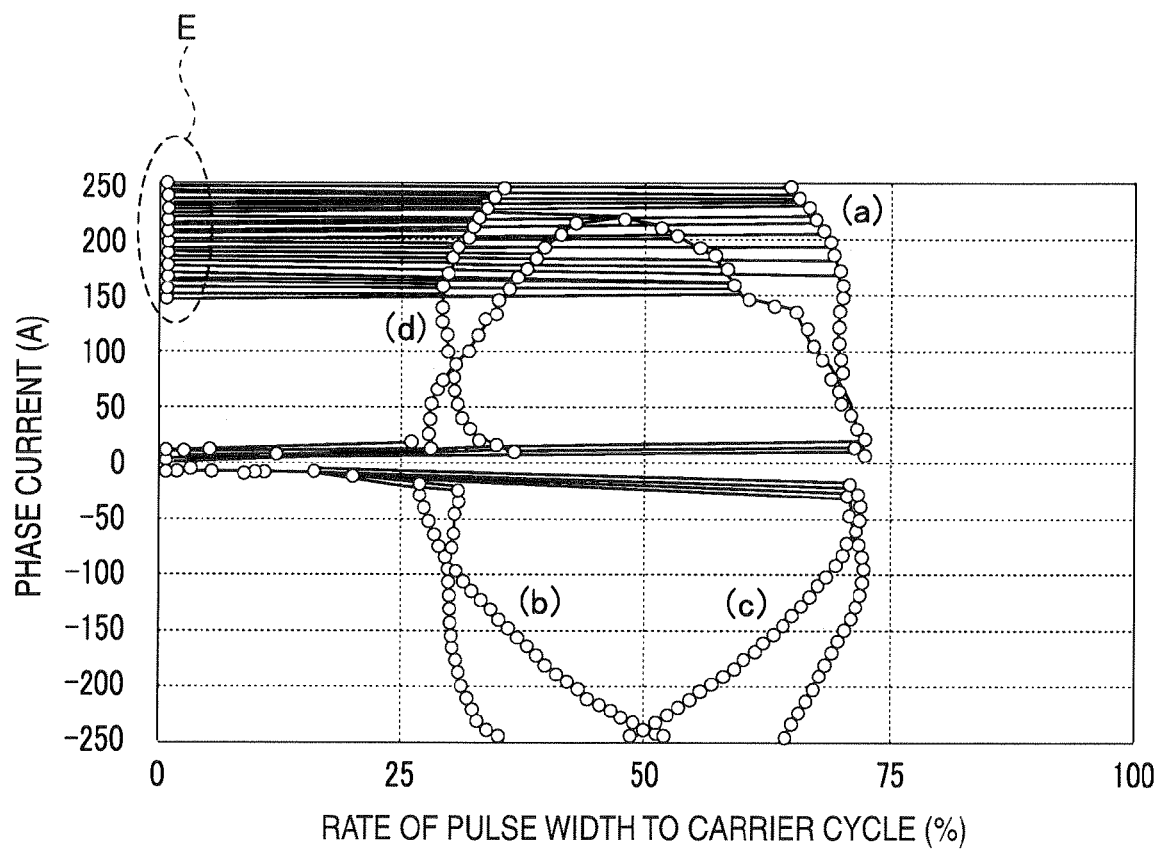
FIG. 13 is a chart showing an example in which a result of the inspection is output visually.

FIG. 13 is a chart showing an example in which a result of an inspection is visually output.

The example shown in FIG. 13 is a chart in which a correspondence of a phase current value to a pulse width in a flow of a phase current (a W phase) to be inspected to each element is plotted, and corresponds to FIG. 4.

In the same manner as in FIG. 4, in graphs (a) to (d) in FIG. 13, a correlation of the phase current value corresponding to one electrical angle cycle with respect to the pulse width is obtained from values detected by the voltage detector 11 (FIG. 10) and the current detector 12 (FIG. 10) and is thus plotted. In FIG. 13, (a) indicates a phase current flowing to the IGBT 105, (b) indicates a phase current flowing to the FWD 115, (c) indicates a phase current flowing to the IGBT 106, and (d) indicates a phase current flowing to the FWD 116.

A pulse width and a phase current value in each of the elements of the IGBTs 105 and 106 and the FWDs 115 and 116 can be obtained from the values detected by the voltage detector potion 11 and the current detector 12 by the same processing as the processes shown in FIGS. 5 and 6, for example.

In comparison of the example in FIG. 13 with FIG. 4, it is possible to confirm plots departing from a normal range in a part indicated as E in high current areas of the graphs (a) and (d). The plots indicate minute pulses having very small pulse widths. The minute pulse is found with difficulty even if the phase current value and the phase voltage value are monitored individually, and appears with difficulty even if a change in a phase current having each phase is visualized as shown in FIG. 2, for example. It is possible to find the minute pulse as an apparent abnormality as shown in FIG. 13 by obtaining the phase current value corresponding to one electrical angle cycle with respect to the pulse width from the values detected by the voltage detector 11 and the current detector 12 and plotting and visually outputting the phase current value as in the embodiment.

The chart of FIG. 13 is displayed in a display state (not shown) provided in a display device (not shown) connected to the inspecting ECU 4 or other apparatuses constituted to enable a communication with the inspecting ECU 4 or is printed and output onto a paper.

As described above, the inspecting ECU 4 according to the embodiment applying the invention functions as the inspecting device together with the GD substrate 3, and is connected to the inverter circuit 100 for converting a power supplied from the voltage source 2 through a plurality of elements and outputting the converted power to the motor 5, can switch a conducting state of each of the elements in the inverter circuit 100 in accordance with a driving condition for defining the output torque and the rotating speed in the motor 5, switches the conducting state of the element to be inspected in accordance with a driving condition for inspection which is a condition corresponding to a whole active region of the element in a state that the inspecting load 50 is connected to the inverter circuit 100 as shown in FIG. 10, detects a phase current flowing to the element and a voltage between terminals of the element by the voltage detector 11 and the current detector 12, and obtains a correlation of an ON time of the element to be inspected and a phase current value based on the current and the voltage which are detected while carrying out a control in accordance with the driving condition for inspection. Therefore, it is possible to quickly inspect the quality of the element in the inverter circuit 100 by using a single driving condition for inspection.

Moreover, the active region of the element to be inspected is obtained from the phase current flowing to the element to be inspected and the voltage between the terminals of the element in the case in which the conducting state of the element in the inverter circuit 100 is switched to carry out an operation in accordance with a plurality of driving conditions for actually driving the motor 5, and the inspection is executed by using the driving condition for inspection which is determined to include the active region. Therefore, quality in the whole active region of the element to be inspected can be decided more accurately depending on a single driving condition for inspection.

The active region of the element to be inspected includes all correlations of the ON time of the element to be inspected and the phase current value which are obtained from the phase current flowing to the element and the voltage between the terminals of the element as shown in FIGS. 7 and 8 in the case in which the conducting controller operates the inverter circuit 100 by using the driving conditions, and can be defined as a phase current value corresponding to the ON time of the element. Therefore, the whole active region can be obtained accurately as a sum of the operating regions of the elements corresponding to the driving conditions. Consequently, it is possible to properly set the driving condition for inspection, thereby carrying out a more accurate inspection.

Moreover, the inspecting load 50 has a structure to include the stators 51, 52 and 53 of the motor 5 in place of the motor 5. Therefore, it is possible to reduce a cost by omitting the use of the motor 5. Thus, it is possible to inspect the inverter circuit 100 in an operating environment which is substantially equal to the case in which a power is output to the motor 5.

Furthermore, the inspecting ECU 4 obtains the correlation of the ON time of the element to be inspected and the phase current value from the phase current flowing to the element and the voltage between the terminals of the element while controlling the conduction of the element to be inspected in accordance with the driving condition for inspection, and visualizes and outputs the correlation as shown in FIG. 13. Therefore, it is easy to find an operating failure which is hard to find by simply monitoring a current flowing to the element and a voltage.

Moreover, the inspecting ECU 4 switches the conducting state of the element to be inspected in such a manner that the current value of the phase current is continuously increased from zero in accordance with the driving condition for inspection. Therefore, it is possible to carry out the inspection without an omission in the whole active region of the element to be inspected.

In addition, the inspecting ECU 4 switches the IGBT to be inspected in such a manner that the phase difference between the phase current and the phase voltage is $\pi/2$ while operating the inverter circuit 100 in accordance with the driving condition for inspection.

A method of inspecting the inverter circuit 100 according to the embodiment includes an active region calculating step of switching the conducting state of each element in the inverter circuit 100 and operating the element in accordance with the driving condition for defining the output torque and the rotating speed in the motor 5 in the state that the motor 5 is connected to the inverter circuit 100, and obtaining the active region of the element from the phase current flowing to the element to be inspected (in the example, the IGBTs 105 and 106) during one electrical angle cycle in the operation and the voltage between the terminals of the element, a driving condition setting step of setting a driving condition for inspection corresponding to the whole active region of the element which is obtained at the active region calculating step, an inspecting step of switching the conducting state of the element to be inspected in accordance with the driving condition for inspection which is set at the diving condition setting step in a state that the inspecting load 50 having the stators 51, 52 and 53 of the motor 5 is connected to the inverter circuit 100 in place of the motor 5, and an output value calculating step of obtaining the correlation of the ON time of the element and the phase current value based on the phase current flowing to the element to be inspected and the voltage between the terminals of the element at the inspecting step. Consequently, it is possible to quickly inspect the quality of the element by using the single driving condition for inspection as described above. Moreover, it is possible to carry out the inspection in the operating environment which is substantially equal to the case in which a power is output to the motor 5 without using the motor 5. When the driving condition for inspection is to be set, furthermore, the active region of the element to be inspected is obtained from the phase current and the voltage between the terminals of the element in the case in which the conducting state of the element in the inverter circuit 100 is switched and the element is thus operated in accordance with the driving conditions for actually driving the motor 5, and the driving condition for inspection is set to include the active region. Therefore, it is possible to accurately decide the quality in the whole active region of the element to be inspected.

The embodiment shows a mode applying the invention and the invention is not restricted to the embodiment.

Although there is employed the structure in which the voltage detector 11 is connected between the collector and the emitter in the IGBT in the embodiment, the invention is not restricted thereto but the voltage detector 11 may be connected between the gate and the emitter, for example. While the description is given by taking, as an example, the case in which the inverter circuit 100 including the IGBT as a switching element is inspected in the embodiment, moreover, it is also possible to employ a structure in which an FET is used as the switching element, for instance. Although the description is given on the assumption that the driving condition in the case in which the inverter circuit 100 is operated is defined by the rotating speed and the output torque in the motor 5, furthermore, the invention is not restricted thereto but the driving condition may be defined by a frequency of a phase current, a current value and a voltage value which are output by the inverter circuit 100. Although the description is given by taking, as an example, the case in which each of the elements provided in the three-phase output inverter circuit 100 of a bridge type is inspected in the embodiment, moreover, it is a matter of course that the invention can also be applied to inverter circuits of other types and the other detailed structures can also be changed optionally.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. A method for inspecting a power converter that converts a power supplied from an external power supply through a plurality of elements and outputs the converted power to a motor, the method comprising:

an active region calculating step of switching a conducting state of each of the elements in the power converter in accordance with a driving condition for defining an output torque and a rotating speed of the motor to operate the elements in a state that the motor is connected to the power converter so as to obtain an active region of an element to be inspected based on a phase current flowing in the element to be inspected and a voltage between terminals of the element to be inspected for one electrical angle cycle during the operation, a driving condition setting step of setting a driving condition for inspection corresponding to the active region of the element to be inspected which is obtained at the active region calculating step, an inspecting step of switching a conducting state of the element to be inspected in accordance with the driving condition for inspection which is set at the driving condition setting step in a state that an inspecting load is connected to the power converter, and an output value calculating step of obtaining a correlation of an ON time and a phase current value based on the phase current flowing in the element to be inspected and a voltage between the terminals of the element to be inspected at the inspecting step.

2. An inspecting device connected to a power converter that converts a power supplied from an external power supply through a plurality of elements and outputs the converted power to a motor, the inspecting device comprising:

a conducting controller that switches a conducting state of each of the elements in the power converter in accordance with a driving condition for defining an output torque and a rotating speed of the motor, and switches the conducting state of an element to be inspected in the power converter in accordance with a driving condition for inspection in a state that an inspecting load is connected to the power converter, a detector for detecting a phase current flowing in the element to be inspected and a voltage between terminals of the element to be inspected, and an output value calculator for obtaining a correlation of an ON time and a phase current value of the element to be inspected based on a current and a voltage which are detected by the detector while the conducting controller controls in accordance with a driving condition for inspection, wherein the driving condition for inspection is arbitrarily programmable in accordance with the active region of the element to be inspected.

3. The inspecting device as in claim 2, wherein the driving condition for inspection is set to include an active region of the element to be inspected which is obtained from the phase current flowing in the element to be inspected and the voltage between the terminals of the element during one electrical angle cycle in the case that the conducting controller switches the conducting state of each of the elements in the power converter to operate the elements in accordance with a plurality of driving conditions for driving the motor.

4. The inspecting device as in claim 2, wherein the correlation between the ON time and the phase current value of the element to be inspected which are obtained by the output value calculator is output as visual information.

5. The inspecting device as in claim 2, wherein the conducting controller switches the conducting state of the element to be inspected so that the phase current flowing in the element to be inspected increases continuously from zero in accordance with the driving condition for inspection.

6. The inspecting device as in claim 2, wherein the conducting controller switches the conducting state of the element to be inspected so that a phase difference between the phase current flowing in the element to be inspected and the phase voltage of the element to be inspected is $\pi/2$.

7. The inspecting device as in claim 2, wherein the driving condition for inspection corresponds to the whole active region of the element to be inspected.

* * * * *